United States Patent
Dudd, Jr. et al.

(10) Patent No.: US 6,422,023 B1
(45) Date of Patent: Jul. 23, 2002

(54) TURBINE ENGINE CONTROL WITH ELECTRONIC AND PNEUMATIC GOVERNORS

(75) Inventors: John E. Dudd, Jr., Three Rivers, MI (US); Dennis G. Demers, Mishawaka, IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/908,427

(22) Filed: Jul. 18, 2001

Related U.S. Application Data

(60) Division of application No. 09/418,053, filed on Oct. 14, 1999, now Pat. No. 6,282,882, which is a continuation-in-part of application No. 09/398,133, filed on Sep. 17, 1999, now Pat. No. 6,357,219.
(60) Provisional application No. 60/111,841, filed on Dec. 11, 1998, and provisional application No. 60/111,858, filed on Dec. 11, 1998.

(51) Int. Cl.[7] .................................................. F02C 9/28
(52) U.S. Cl. .......................................................... 60/773
(58) Field of Search ........................ 60/39.03, 39.281, 60/773; 416/27, 28, 30

(56) References Cited

U.S. PATENT DOCUMENTS

| | | | | |
|---|---|---|---|---|
| 3,034,583 A | * | 5/1962 | Best | 416/27 |
| 3,309,868 A | * | 3/1967 | Downing et al. | 416/27 |
| 4,619,110 A | | 10/1986 | Moore | 60/39.091 |
| 4,910,956 A | | 3/1990 | Legore | 60/39.03 |
| 5,896,737 A | | 4/1999 | Dyer | 60/39.03 |

FOREIGN PATENT DOCUMENTS

FR   2 704 905   11/1994

\* cited by examiner

Primary Examiner—Louis J. Casaregola
(74) Attorney, Agent, or Firm—Larry J. Palguta

(57) ABSTRACT

A turbine engine (49) fuel delivery system of the type including a pneumatic governor has an electronic governor and an engine excess stress avoidance feature which disable the pneumatic governor (70) so long as the engine speed exceeds a prescribed value and an electronic control unit (45) continues to function properly. The system transfers governing responsibility to the electronic control unit (45) which controls a torque motor and solenoid valve fuel diversion line (22). The system monitors an engine (49) operating parameter such as gas generator speed (37), power turbine speed, engine output torque, or engine temperature and further diminishes fuel flow to the engine (49) when the monitored parameter exceeds a threshold value. The system resumes normal speed governoring flow when that parameter returns to an acceptable level. The system also senses rotor blade pitch to reduce rotor droop and increases fuel flow to the engine (49) when the pitch (44) increases, and decreasing the fuel flow to the engine (49) when the rotor blade pitch (44) decreases.

9 Claims, 5 Drawing Sheets

TURBINE ENGINE CONTROL WITH ELECTRONIC AND PNEUMATIC GOVERNORS

RELATED APPLICATIONS

This is a division of U.S. patent application Ser. No. 09/418,053 filed Oct. 14, 1999 (U.S. Pat. No. 6,282,882).

This application claims the benefit of U.S. Provisional Patent Applications Nos. 60/111,841 and 60/111,858 both filed Dec. 11, 1998, and is a continuation-in-part of U.S. application Ser. No. 09/398,133 filed on Sep. 17, 1999 (U.S. Pat. No. 6,357,219), entitled "TURBINE ENGINE CONTROL SYSTEM" whose entire disclosure is incorporated by reference herein.

The present invention relates generally to fuel delivery systems for engines, especially gas turbine engines, and more particularly to such fuel delivery systems for aircraft such as helicopters incorporating engine torque and temperature limiting features. The present invention provides an anticipatory correction of fuel flow to minimize problems in helicopter performance such as rotor droop.

BACKGROUND OF THE INVENTION

Helicopter rotor blades are typically variable pitch and frequently that pitch is automatically varied during each revolution to compensate for differences in lift between the blade moving in the direction of helicopter motion and the blade moving in the opposite direction. Collective pitch is a measure of the average blade pitch and that average blade pitch is controllable by the pilot.

When a helicopter pilot causes an increase in rotor blade pitch, the blade angle of attack is increased (the blade takes a bigger bite of air) and the engine slows due to the increased load. A conventional engine governor will sense this decrease in speed and increase the fuel flow in an attempt to resume the previous speed. This temporary dip in rotor speed is called rotor droop. The opposite result occurs with a decreased pitch command.

Many current control systems for turbine engines provide limited anticipation to collective pulls which allows the rotor to droop down to 95%. In addition, these systems do not provide temperature limiting (either during engine start or in flight) or torque limiting during flight or acceleration contouring. The pilot has to control the helicopter to prevent exceedences on temperature as well as torque. This adds a tremendous burden to the pilot.

An audible alarm indicative of over-stress limits including temperature, output torque and engine speed, instructing the pilot to provide the corrective action is shown in U.S. Patent 4,619,110. A first low level signal is initiated when the operating parameter in question reaches a predetermined level below the allowable limit, and the audio signal is increased when the allowable limit is approached. The system automatically limits fuel flow to avoid over-stressing the engine, but this limiting may be over-ridden under emergency conditions. Fuel flow limiting is accomplished by bleeding some air from a pneumatic fuel controller. Water and/or additional fuel may also be automatically injected into the engine fuel flow. This patented scheme utilizes pneumatic control of one fuel valve for all fuel flow control. Flowing pneumatic systems are limited in terms of reliability because of the inherent issues associated with flowing air laden with the products of combustion through computational control circuits. Another limitation of such control systems is the failure to offer redundancy regarding power turbine governing. Subsequently system safety could be improved in this area.

New full authority digital electronic control (FADEC) systems that have been developed in recent years offer solutions to these problems but these systems are high cost and are only offered on new expensive model helicopters.

In our aforementioned copending application, an engine overtemperature avoidance technique operable only during engine start-up monitors engine temperature and diminishes fuel flow to the engine when that monitored temperature exceeds a threshold temperature. While this system admirably performs its intended function of avoiding thermal stress to the engine during start-up, its function ceases upon the engine reaching normal idle speed.

SUMMARY OF THE INVENTION

It is desirable to provide automatic power turbine governing and torque limiting in a continuous, economical, relatively simple, redundant and retrofitable way. It is also desirable to anticipate engine requirements and to modify the fuel supply rate as required to minimize changes in engine speed due to changes in engine load.

The present invention provides solutions to the above problems by providing a fuel burning engine fail-safe stress avoidance system which monitors a number of engine operating parameters and inhibits the flow of fuel to the engine when one or more of the parameters exceeds its prescribed limit. The avoidance system assumes control from a pneumatic engine governor and relinquishes that control upon detecting an avoidance system malfunction. The system offers most of the advantages of a FADEC system at a fraction of the cost. It is affordable to most users both as an upgrade and to new original equipment manufacturers.

In general, when a engine reaches normal idle speed, the function of a pneumatic engine speed governor is transferred to a controllable fuel flow bypass which selectively diverts fuel exiting a fuel flow control valve away from the engine and back to a fuel pump thereby decreasing the rate of fuel flow to the engine. The fuel bypass includes a normally closed solenoid operable valve and a torque motor control valve connected in series between the control valve outlet and the fuel pump inlet. The pneumatic governor is disabled by energizing a normally open solenoid valve connecting an air supply source to the pneumatic governor. This fuel bypass is operable independently from the conventional bypass which diverts fuel exiting the fuel control valve away from the engine and back to the fuel pump to maintain a relatively constant pressure differential across the fuel control valve and diverts fuel exiting the control valve away from the engine and back to the fuel pump to maintain at least one of turbine speed, gas generator speed, engine output torque and engine temperature below respective threshold levels.

DESCRIPTION OF THE PREFERRED EMBODIMENT

Figure 2:
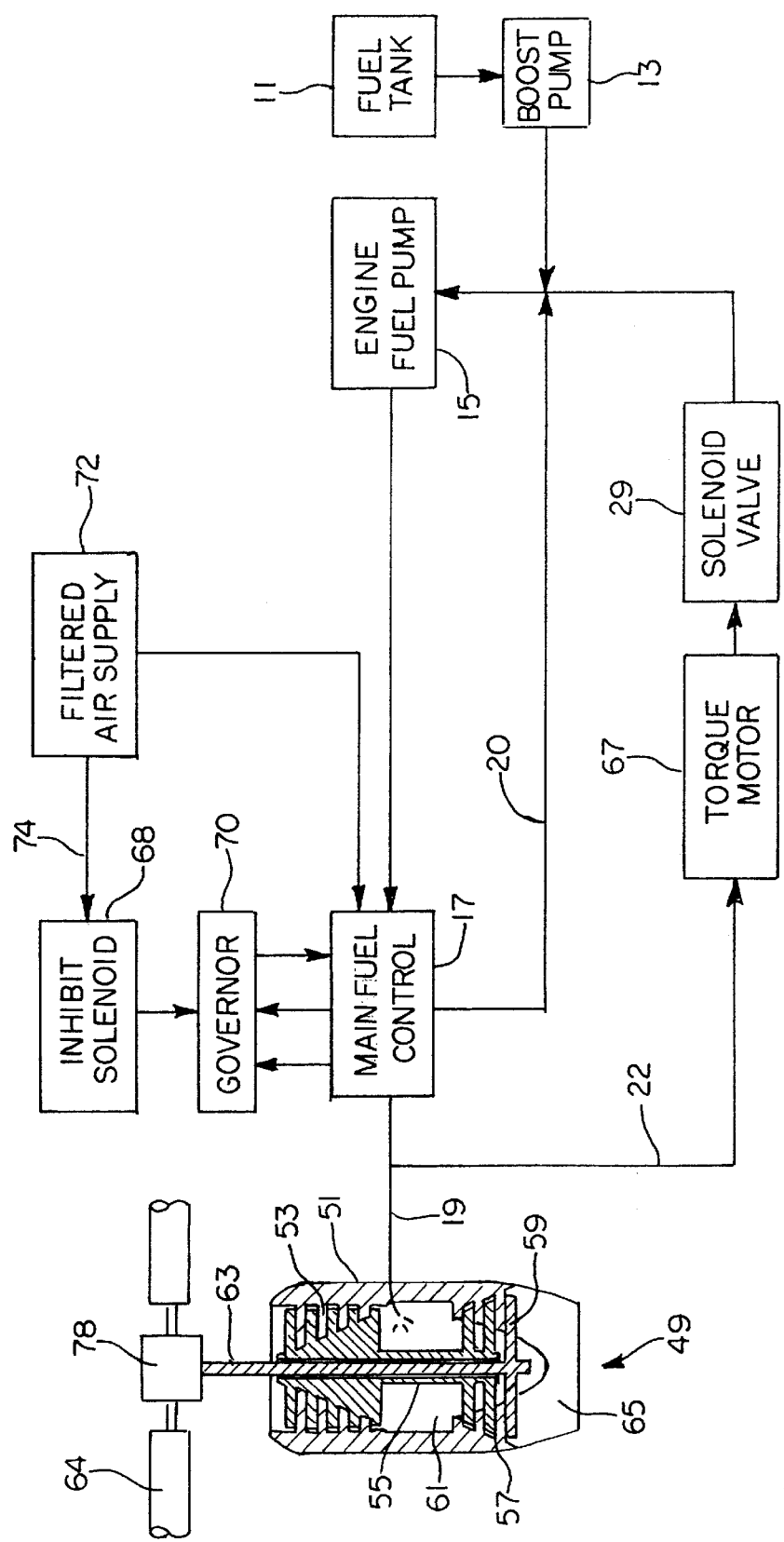
FIG. 2 is a detailed schematic illustration of the fuel flow and pneumatic control portions of the system of FIG. 1.

In FIG. 2, a simplified helicopter free power turbine turbojet engine 49 is illustrated. The engine has a power output shaft 63 which is conventionally coupled to helicopter rotor blades 64 by rotor drive mechanism 78. Shaft 63 is driven by a power turbine 59. Air enters the engine housing 51 by way of compressor 53 and forms a combustible fuel/air mixture in combustor 61. The exiting combustion gasses power the compressor turbine 57 which drives shaft 55 and the compressor 53 and also drive the power turbine 59. Exhaust gasses exit by way of chamber 65 and the temperature (T4.5) of the exiting gasses is monitored by a set of temperature probes within chamber 65.

Figure 1:
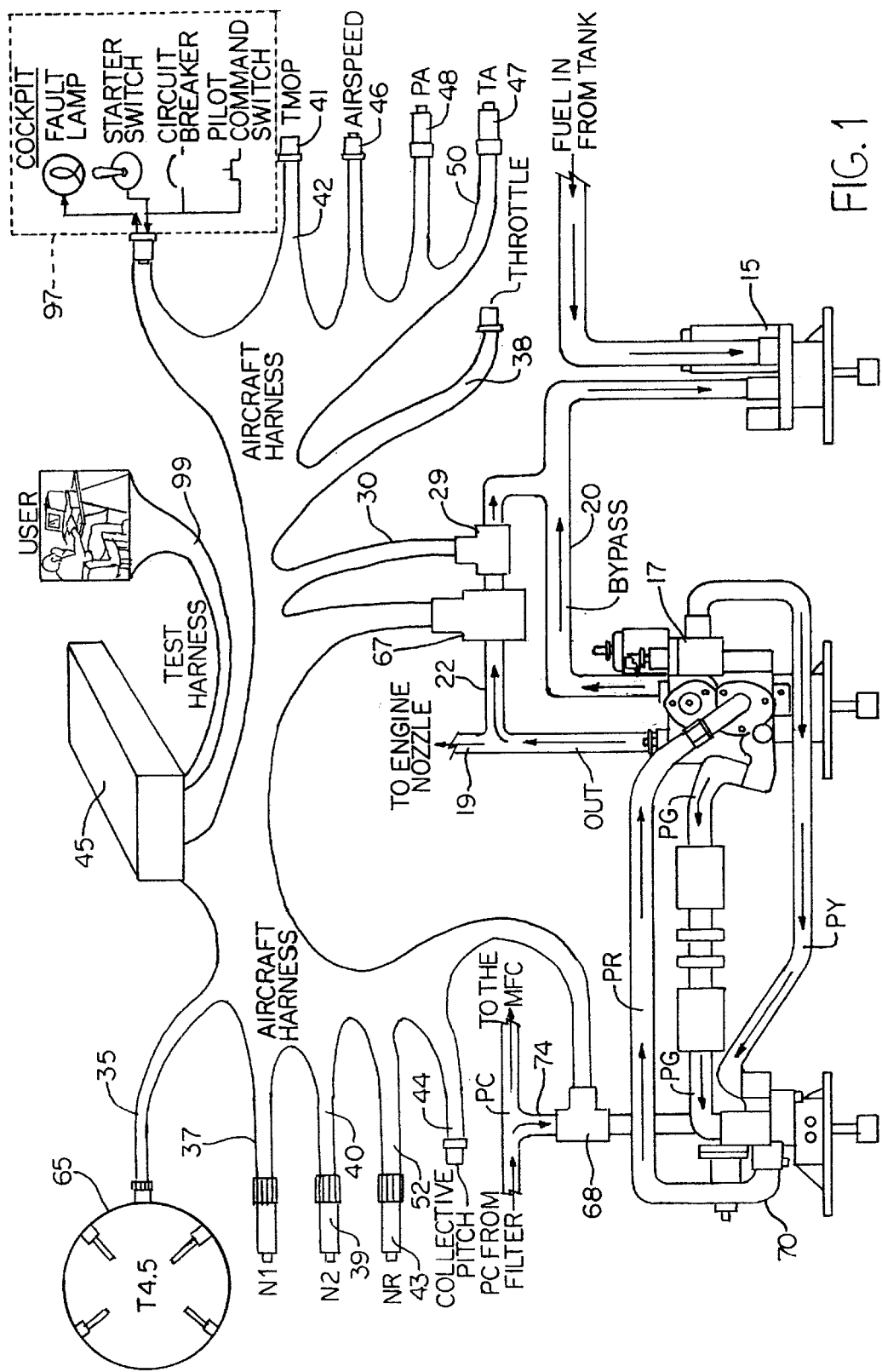
FIG. 1 is a schematic illustration of an engine control system according to the present invention.

Referring now to FIGS. 1 and 2, fuel is supplied from a tank 11 and a remotely located pump 13 to the engine fuel pump 15, and then, by way of the main fuel control 17 and conduit 19, to the nozzles within combustor 61 of turbojet engine 49. In addition to a conventional head maintenance bypass 20 for maintaining a relatively constant pressure differential across the fuel control valve 17, a normally closed fuel trim solenoid valve or bypass 29 is controllable by signals on line 30 to divert fuel from the engine by way of line 22 back to the inlet of pump 15. A torque motor could be used instead of a solenoid. This second fuel bypass operates independently from the first bypass under certain conditions to divert fuel exiting the control valve 17 away from the engine and back to the fuel pump 15. During engine start, this bypass operates as described in the abovementioned related copending application U.S. Ser. No. 09/398,133 to maintain an engine temperature below a threshold level. In our aforementioned copending application U.S. Ser. No. 09/398,133, bypass 29 is pulse-width-modulated and operable only during engine start-up. It is enabled upon engine light-off and disabled when the engine reaches normal idle speed. Reference may be had to that application for further details of this feature. In the present invention, however, bypass valve 29 remains enabled under certain conditions. Valve 29 is in series with another valve such as torque motor 67. During start-up, this valve 67 is nearly closed providing the flow restrictor function discussed in the abovementioned copending patent application. Alternatively, a fixed flow restrictor may be provided in parallel with the valve 67 and the valve closed during start-up. After start-up is completed and the engine is idling, normally, the solenoid valve is opened, the torque motor closes maintaining the bypass line 22 blocked.

FIGS. 1 and 2 also illustrate a conventional flowing pneumatic fuel control including the power turbine governor 70 which receives air at the engine compressor pressure PC from a filtered supply 72 by way of line 74. A normally open flow inhibiting solenoid valve 68 is located in line 74 to selectively prevent the supply of air to the governor 70. After start-up, valve 68 is enabled and the pneumatic governor 70 is disabled allowing the governing function to be assumed by the ECU "electronic control unit C" 45.

Control unit 45 receives input information on the aircraft harness line 42 from a torque meter oil pressure sensor or TMOP 41 associated with the rotor drive mechanism 78, the gas generator (shaft 55) speed N1 on electrical harness line 37, power turbine (shaft 63) speed N2 on line 40 from speed sensor 39, rotor speed NR from speed sensor 43 by way of line 52, T4.5 turbine outlet temperature by way of line 35, ambient pressure (PA) from sensor 48, ambient temperature (TA) by way of line 50 from sensor 47, and airspeed from sensor 46. A measure of the collective rotor blade pitch is also received on line 44 and an indication of throttle control requested fuel flow is available on line 38 from respective potentiometers or other sensors.

Under normal operation, the mechanical power turbine governor function that provides a N1 reset signal to the Main Fuel Control (MFC) 17 is deactivated via the governor inhibit solenoid 68 closure shutting off the pneumatic supply. This forces the MFC 17 on it's acceleration schedule. The mechanical N1 and N2 topping or overspeed governors (Py) remain functional with full authority of control. Using inputs N1, N2, NR, T4.5, TMOP, collective pitch, the rate of change of collective pitch, and throttle position, the ECU 45 schedules fuel to the engine nozzle (derichment) by controlling the Wf torque motor 67 for power turbine governing, temperature limiting, torque limiting, and acceleration contouring. The Wf lockout solenoid 29 is energized and open in this mode.

Figure 3:
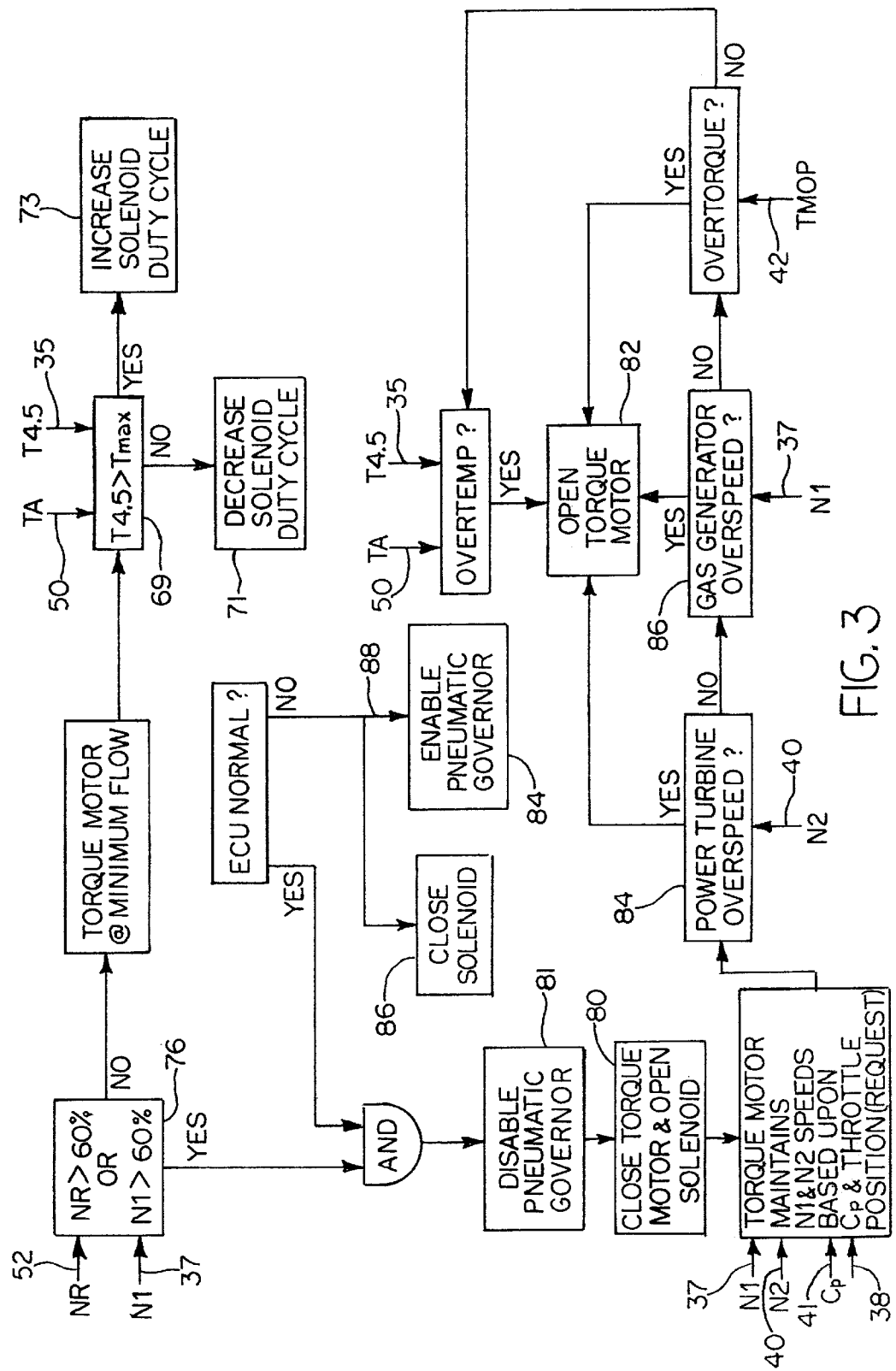
FIG. 3 is a block diagram of the temperature limiting, torque I and speed governing functions of the system of FIGS. 1 and 2.

FIG. 3 illustrates a simple algorithm implementing the present invention. So long as the gas generator speed N1 and the rotor speed NR are both less than 60% of the full throttle speed a "no" from block 76 enables the torque motor 67 to provide its minimum flow limiting flow. Temperature monitoring at 69 limits excess temperature during start as described in the abovementioned copending patent application by increasing 73 or decreasing 71 the solenoid 29 duty cycle. When normal idle speed is achieved (a "yes" from block 76) and with the ECU 45 functioning properly, the pneumatic governor 70 is disabled (block 81) by energizing (closing) the valve 68. Torque motor 67 is closed and solenoid 29 is opened as indicated at 80. Above engine idle speed the torque motor is opened/closed to maintain gas generator and power turbine speeds (block 40) based upon Cp and throttle positions. Several engine operating parameters are monitored for excessive values and upon the occurrence of a "yes" indicative of an overspeed, overtorque or overtemperature value, the torque motor is further opened as indicated at 82 diverting more fuel from the engine back to the fuel pump. An ECU 45 malfunction returns governor responsibility to the pneumatic system as indicated at 84 and 86.

Figure 4A:
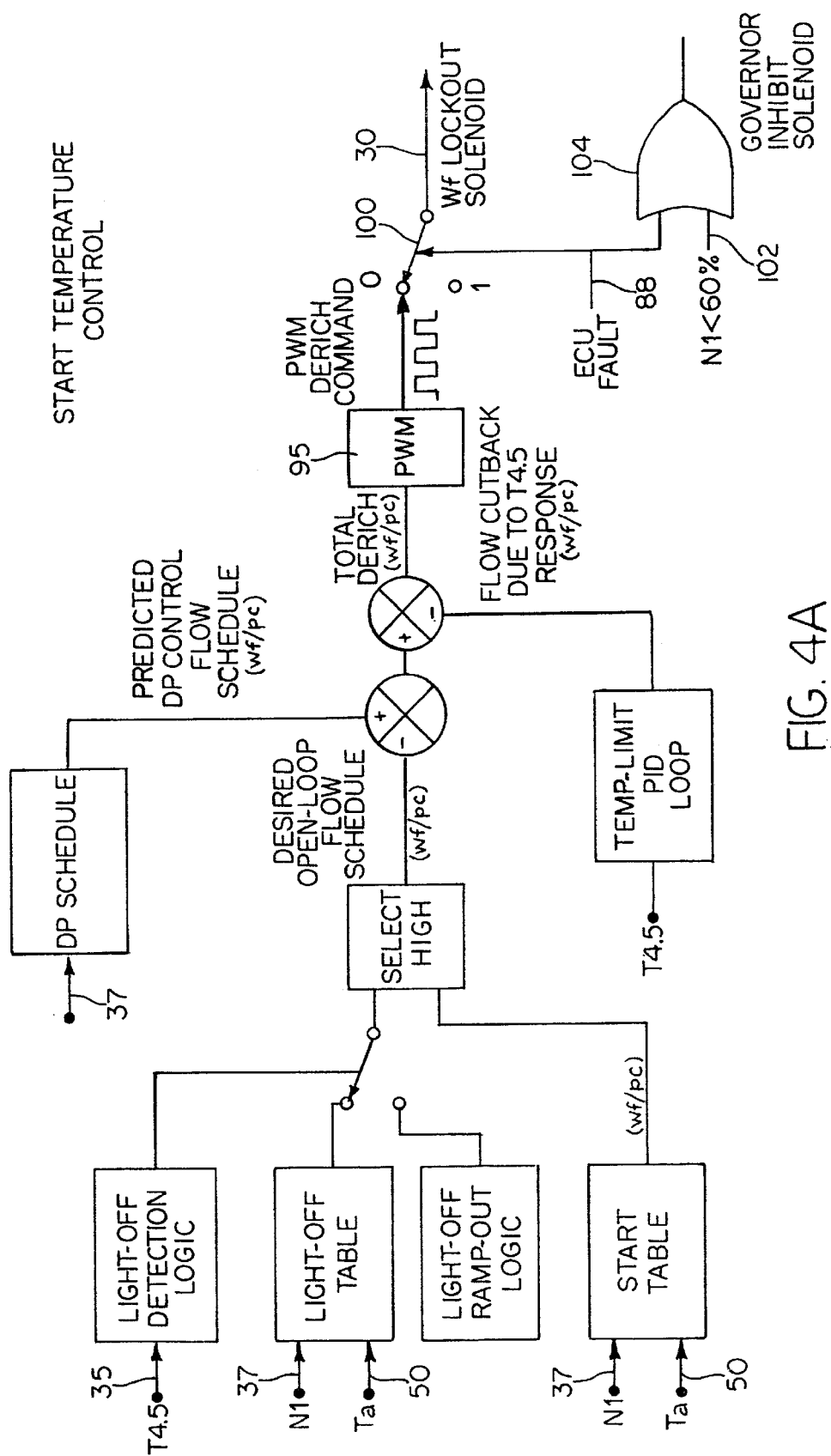
FIGS. 4A and B are more detailed schematic diagrams of the temperature and speed limiting portions of the electronic control of FIG. 1.
Figure 4B:
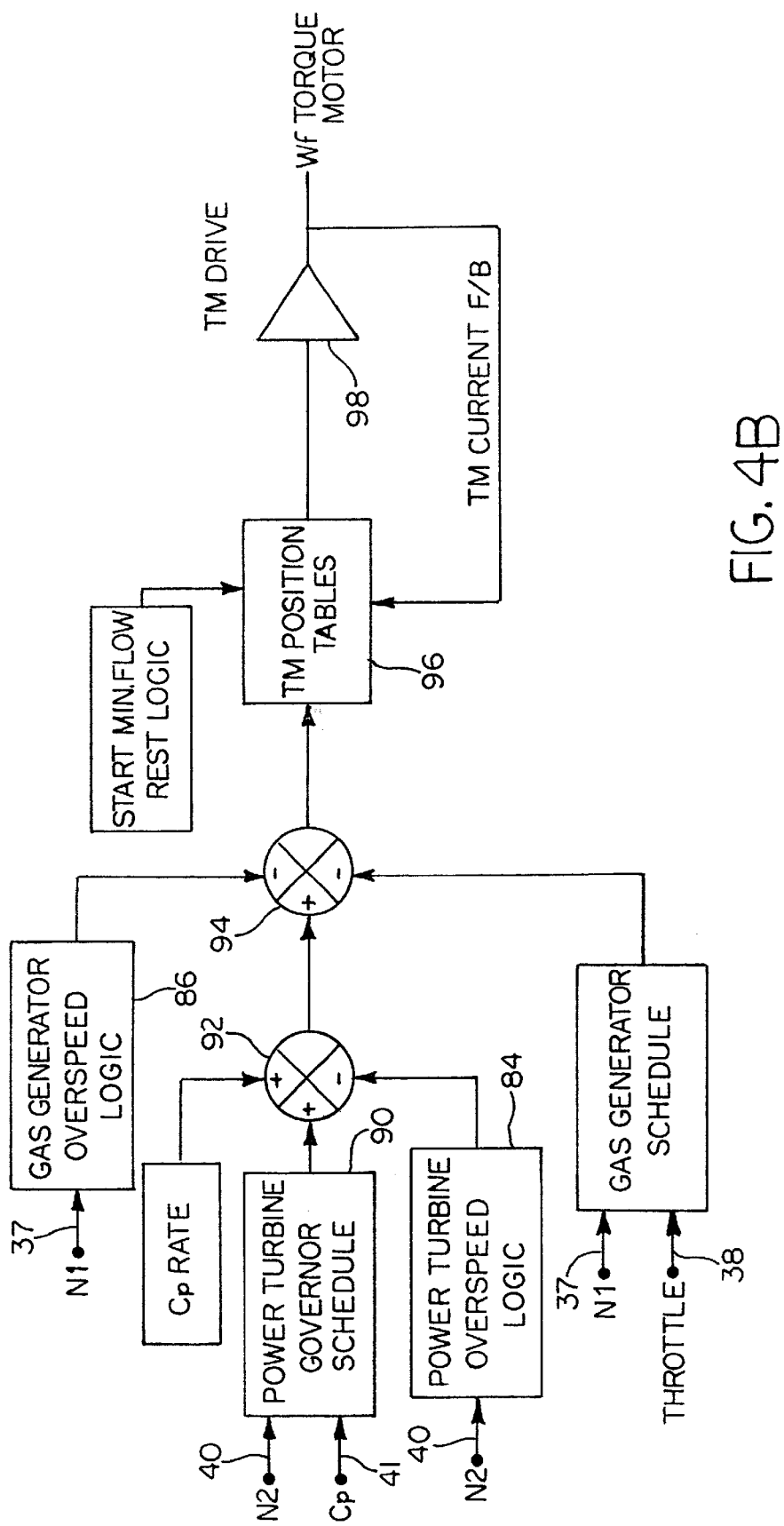

FIG. 4A illustrates the logic controlling the generation at 95 of the pulse-width-modulated signals controlling solenoid 29 during start-up. The start-up aspects of FIG. 4A are discussed in greater detail in the abovementioned copending patent application. During normal operation at and above idle speed, FIG. 4B illustrates the logic supplying signals to control and open the torque motor 67 in the event of power turbine overspeed as indicated at 84 and gas generator overspeed as indicated at 86. Additionally, collective pitch information on line 40 is applied to the power turbine governor schedule 90 which, in conjunction with power turbine speed information yields a fuel level indicative signal to summer 92. This is combined with throttle and gas generator speed information in summer 94 providing a signal to select a certain level of drive from the torque motor position table 96 to be supplied by way of driver 98 to the torque motor 67. As noted in the discussion of FIG. 3, an ECU malfunction signal on line 88 returns governor responsibility to the pneumatic system. In FIG. 4A, an ECU malfunction signal causes switch-100 to move to the "1" position removing drive allowing the normally closed solenoid valve to close. The ECU malfunction signal on line 88 and line 102 which carries a signal when the gas generator speed drops below 60% rated speed (normal idle) are supplied to the OR gate 104. If neither of these "problem" signals is present, the normally open governor inhibit solenoid 68 receives a signal and closes. Otherwise, solenoid 68 opens.

Returning to FIG. 1, input and output between the pilot and the system are indicated generally at 97 and include a starter switch, a fault lamp which acknowledges failure of the system, a circuit breaker which produces pilot override for catastrophic system failure, and a pilot command switch input for pilot request for system status and power check. A serial data bus 99 is also provided for maintenance actions (data download) and set-up via a remote personal computer. This allows the recording of monitored parameters and subsequently modifying the engine fuel system hardware or schedules to provide enhanced engine performance achieving overstress avoidance with reduced fuel flow diminution. The serial interface may also be used to provide communication to additional ECUs, to accommodate torque sharing, and OEI for dual engine helicopter applications.

Numerous alternatives should now be apparent. Fuel derichment and control could be accomplished by connection of the Wf Torque Motor 67 and Solenoid 29 to the P2 side of the bypass valve to accommodate a combination of Wf and ratio control rather than direct derichment from the nozzle flow. The torque motor 67 could be replaced with a pulse-width-modulated solenoid valve to provide derichment. For low flow control conditions, particularly during engine start, the torque motor 67 could be pulse-with-modulated instead of the solenoid 29. Alternatively for engine starts, the torque motor 67 could be held almost closed to limit the authority (flow) by acting as a restriction or a restrictor may be added in parallel with the torque motor. The bypass valve motor 29 and/or 67 could be mechanically driven directly or indirectly (lever mechanism) using a linear device such as a proportional solenoid or torque motor in order to provide ratio control. In summary, the overage avoidance system should enhance performance and reduce rotor droop by 40% to 50% as well as provide start control, acceleration contouring, torque limiting and temperature limiting. The system will provide a primary control methodology that will be electro hydromechanical in nature and not subject to flowing pneumatic shortfalls. The flowing pneumatic system will serve as a full authority reversionary or backup control system identical to that currently certified for the pertinent application.

Since the main fuel control flowing pneumatic system will be pressurized but not flowing during ECU operation and the Power Turbine Governor will not be pressurized during ECU operation, operational life will be substantially improved.

What is claimed is:

1. An engine excess stress avoidance process for a fuel burning engine having an electronic control unit and a pneumatic engine speed governor, comprising the steps of:

disabling the pneumatic governor so long as the engine speed exceeds a prescribed value and the electronic control unit continues to function properly;

monitoring an engine operating parameter; and diminishing fuel flow to the engine when the monitored engine operating parameter exceeds a threshold value.

2. The process of claim 1, wherein the monitored engine operating parameter is exhaust gas temperature.

3. The process of claim 1, wherein the engine is a turbojet engine with a free power turbine and the monitored engine operating parameter is power turbine speed.

4. The process of claim 1, wherein the engine is a turbojet engine with a free power turbine and the monitored engine operating parameter is gas generator speed.

5. The process of claim 1, wherein the monitored engine operating parameter is engine output torque.

6. The process of claim 1, including the additional steps of recording the monitored engine operating parameter, fuel flow diminution and additional engine operating parameters, and subsequently modifying the engine fuel system to provide enhanced engine performance achieving engine stress avoidance with reduced fuel flow diminution.

7. The process of claim 1, wherein fuel normally flows from an engine fuel pump through a main fuel control to the engine, the step of diminishing fuel flow to the engine including diverting a portion of the fuel flow to the engine from the main fuel control back to the engine fuel pump.

8. The process of claim 1, further including the step of resuming undiminished fuel flow when the monitored engine operating parameter falls below the threshold value.

9. The process of claim 1, wherein the process further includes reducing helicopter rotor blade droop and comprises the steps of sensing rotor blade pitch, increasing fuel flow to the engine when the pitch increases, and decreasing the fuel flow to the engine when the rotor blade pitch decreases.

* * * * *